(12) United States Patent
Nakashima et al.

(10) Patent No.: US 10,899,948 B2
(45) Date of Patent: Jan. 26, 2021

(54) ADHESIVE SHEET

(71) Applicant: NAKASHIMA RUBBER INDUSTRY CO., LTD., Fukuoka (JP)

(72) Inventors: Mikio Nakashima, Kurume (JP); Yoshikuni Takata, Kurume (JP); Takemi Yoshizumi, Kurume (JP); Rikito Eguchi, Fujisawa (JP)

(73) Assignee: NAKASHIMA RUBBER INDUSTRY CO., LTD., Fukuoka (JP)

( * ) Notice: Subject to any disclaimer, the term of this patent is extended or adjusted under 35 U.S.C. 154(b) by 132 days.

(21) Appl. No.: 15/775,065

(22) PCT Filed: Nov. 12, 2015

(86) PCT No.: PCT/JP2015/005653
§ 371 (c)(1),
(2) Date: May 10, 2018

(87) PCT Pub. No.: WO2017/081716
PCT Pub. Date: May 18, 2017

(65) Prior Publication Data
US 2018/0371294 A1 Dec. 27, 2018

(51) Int. Cl.
*C09J 7/21* (2018.01)
*C09J 201/00* (2006.01)
*C08J 5/12* (2006.01)

(52) U.S. Cl.
CPC . *C09J 7/21* (2018.01); *C08J 5/12* (2013.01); *C09J 201/00* (2013.01); *C09J 2400/263* (2013.01)

(58) Field of Classification Search
CPC ............... C09J 7/21; C09J 201/00; C08J 5/12
See application file for complete search history.

(56) References Cited

FOREIGN PATENT DOCUMENTS

| | | |
|---|---|---|
| JP | 2001-039519 A | 2/2001 |
| JP | 2001-260233 A | 9/2001 |
| JP | 2006-213260 A | 8/2006 |
| JP | 2009-240708 A | 10/2009 |
| JP | 2010-013567 A | 1/2010 |
| JP | 2010-077364 A | 4/2010 |
| JP | 4681634 B2 | 5/2011 |

OTHER PUBLICATIONS

Translation of JP 2010-077364. See IDS filed May 10, 2018 for date and inventor.*
International Preliminary Report on Patentability issued in PCT/JP2015/005653; dated May 15, 2018; with English Translation.
An Office Action mailed by the Japanese Patent Office dated Dec. 5, 2019, which corresponds to Japanese Patent Application No. 2017-501738 and is related to U.S. Appl. No. 15/775,065; with English language translation.
International Search Report issued in PCT/JP2015/005653; dated Feb. 9, 2016.
Written Opinion issued in PCT/JP2015/005653; dated Feb. 9, 2016.

* cited by examiner

*Primary Examiner* — Victor S Chang
(74) *Attorney, Agent, or Firm* — Studebaker & Brackett PC

(57) ABSTRACT

The adhesive sheet for bonding an unvulcanized rubber to a metal, including a base cloth layer impregnated with a solvent dispersed type vulcanization adhesive having reactivity with the unvulcanized rubber; and an adhesive layer having reactivity with the metal.

8 Claims, 7 Drawing Sheets

ADHESIVE SHEET

TECHNICAL FIELD

The present invention relates to an improved adhesive sheet to be used for bonding an unvulcanized rubber to a metal.

BACKGROUND ART

Hitherto, as disclosed in, for example, Patent Literature 1, there has been a method involving, when a metal and an unvulcanized rubber are bonded to each other through an adhesive, applying a pressure, with heating, to the adhesive to vulcanize the rubber, to thereby bond the rubber and the metal to each other.

In such bonding method, first, it is required to apply a solvent dispersed type vulcanization adhesive to the surface of a metal with a brush, a spray, or the like. As used herein, the term "solvent dispersed type vulcanization adhesive" refers to a polymer compound having adhesiveness in which a filler, a cross-linking agent, a stabilizer, and the like are dispersed or dissolved in an organic mixed solvent. In this operation, a volatile organic compound (hereinafter referred to as "VOC") is used as a solvent for the adhesive. In recent years, in consideration of the health of workers and the environment, it has been required to suppress the emission amount of the VOC, and each operator has been required to voluntarily reduce the emission amount of the VOC, in addition to the emission constraint by the law and the administrative guidance. Thus, in a working area for performing bonding, specific means for suppressing the emission amount of the VOC is required. In order to suppress the emission amount of the VOC, it is required to improve the working environment including a facility and a place. If, however, the working environment is improved in a working area for performing bonding, the magnitude of the improvement tends to be larger. In addition, it is required to thinly apply the solvent dispersed type vulcanization adhesive. However, when an attempt is made to form a thin applied layer of the adhesive with a brush, a spray, or the like, it is difficult to manage the film thickness so that the film thickness becomes uniform. Further, there have been problems in that the coating efficiency is unsatisfactory, and the amount of the adhesive that dissipates without being applied to the surface of the metal increases.

In view of the foregoing, in Patent Literature 2, there is a disclosure of an adhesive sheet for bonding an unvulcanized rubber to a metal, the adhesive sheet including a release film made of a polymer compound; a top coating adhesive layer obtained by applying a solvent dispersed type vulcanization adhesive having reactivity with the rubber onto one surface of the release film and drying the solvent dispersed type vulcanization adhesive; and an undercoating adhesive layer obtained by applying, after drying the top coating adhesive layer, an adhesive having reactivity with the metal onto a surface of the top coating adhesive layer on an opposite side of the release film and drying the adhesive.

This adhesive sheet serves to bond the rubber to the metal as described below. A metal to be bonded to a rubber is set, and a surface of the undercoating adhesive layer of the adhesive sheet on an opposite side of the top coating adhesive layer is pressed against the metal to be fixed to an upper surface of the metal. In this state, a rubber mat is placed on the release film, and the metal is heated while a pressure is uniformly applied to the rubber mat. Then, after the undercoating adhesive layer is firmly fixed to the metal, the release film of the adhesive sheet is removed from the top coating adhesive layer. A pressure is applied, with heating, to the unvulcanized rubber on a surface from which the release film has been removed, to thereby vulcanize the unvulcanized rubber and firmly fix the top coating adhesive layer and the rubber to each other. In this adhesive sheet, the VOC is removed in advance in a manufacturing stage of the adhesive sheet, and hence there is an advantage in that the amount of the VOC at a time of the bonding of the rubber to the metal can be reduced.

CITATION LIST

Patent Literature

PTL 1: Japanese Patent Application Laid-Open No. 2001-260233
PTL 2: Japanese Patent No. 4681634

SUMMARY OF INVENTION

Technical Problem

In the adhesive sheet disclosed in Patent Literature 2, in order that the top coating adhesive layer and the undercoating adhesive layer may be tentatively retained, the adhesive layers are formed on the release film. Accordingly, in the adhesive sheet disclosed in Patent Literature 2, after the undercoating adhesive layer has been firmly fixed to the metal, the release film of the adhesive sheet needs to be peeled and removed. To that end, a step for the removal of the release film is redundantly needed.

As a measure against the foregoing, not a release film that inhibits bonding but an adhesive sheet having such a structure as to retain adhesive layers while securing an adhesive strength is required.

Solution to Problem

The above-mentioned problem can be solved by an adhesive sheet for bonding an unvulcanized rubber to a metal, the adhesive sheet including a base cloth layer impregnated with a solvent dispersed type vulcanization adhesive having reactivity with the unvulcanized rubber, and an adhesive layer having reactivity with the metal.

The above-mentioned problem can be solved by a method of manufacturing an adhesive sheet for bonding an unvulcanized rubber to a metal, the method including forming a base cloth layer by impregnating a base cloth with a solvent dispersed type vulcanization adhesive having reactivity with the unvulcanized rubber and drying the base cloth; and applying a primer having reactivity with the metal onto the base cloth layer to form a layer of the primer.

The above-mentioned problem can be solved by a method of manufacturing an adhesive sheet for bonding an unvulcanized rubber to a metal, the method including impregnating a base cloth with a solvent dispersed type vulcanization adhesive having reactivity with the unvulcanized rubber and drying the base cloth to form a base cloth layer, applying the solvent dispersed type vulcanization adhesive having reactivity with the unvulcanized rubber onto the base cloth layer and drying the solvent dispersed type vulcanization adhesive to form an adhesive layer, and applying a primer having reactivity with the metal onto the adhesive layer to form a layer of the primer.

Advantageous Effects of Invention

According to the present invention, there is no need to perform a step of peeling a release film or the like after an adhesive sheet has been bonded.

DESCRIPTION OF EMBODIMENTS

First Embodiment

Figure 1:
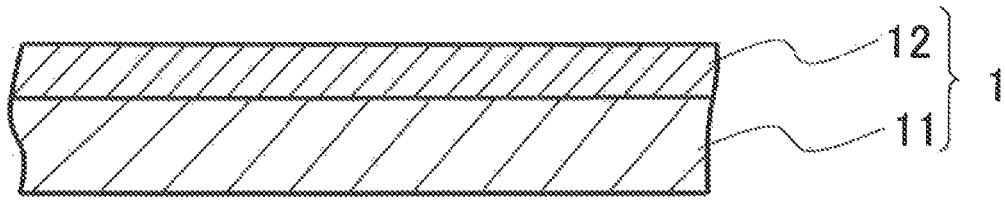
FIG. 1 is a schematic sectional view of an adhesive sheet according to a first embodiment of the present invention.

An adhesive sheet 1 for bonding an unvulcanized rubber to a metal is described as a first embodiment of the present invention with reference to FIG. 1. FIG. 1 is an illustration of a section of the adhesive sheet 1 according to the first embodiment of the present invention. The adhesive sheet 1 of the present invention includes a base cloth 11 and an undercoating adhesive layer 12. In this embodiment, the base cloth 11 and the undercoating adhesive layer 12 are formed so that the surfaces of the undercoating adhesive layer 12 and the layer of the base cloth 11 are brought into contact with each other.

The base cloth 11 is a woven fabric or a nonwoven fabric. Its material is typically, for example, acrylic, acetate, an aramid (meta-type aramid), a high-performance polyethylene (ultrahigh-molecular weight polyethylene), nylon, vinyl, phenol, a polyurethane, a polyester, a polyethylene, a polyethylene terephthalate, a polyvinyl alcohol, a polypropylene, a carbon fiber (a pitch-based carbon fiber or a PAN-based carbon fiber), silicon carbide, an alumina fiber, steel, a ceramic fiber, a glass fiber, cotton, hemp, silk, or rayon. The thickness of the base cloth 11 is typically from 1 μm to 100 μm.

The base cloth 11 is formed by impregnating a solvent dispersed type vulcanization adhesive having reactivity with the unvulcanized rubber. The solvent dispersed type vulcanization adhesive is typically an adhesive containing as a component at least one selected from, for example, a chlorosulfonated polyethylene, a chlorinated natural rubber, a maleimide-based compound, a nitroso-based compound, an acid scavenger, a cross-linking agent and cross-linking accelerator for a CSM rubber, carbon black, and a silica filler.

The undercoating adhesive layer 12 is formed of an adhesive having reactivity with the metal. The adhesive is typically a primer. The layer is obtained by drying the primer. The undercoating adhesive layer 12 contains as a component at least one selected from, for example, phenol, a phenol-based derivative resin, resorcinol, a bisphenol-based epoxy resin, a polyfunctional aromatic epoxy resin, a chlorinated natural rubber, a chlorinated polyethylene, a chlorinated polypropylene, a chlorinated polyolefin, an acid scavenger, an amine-based curing agent, a silica-based filler, and carbon black.

Figure 2:
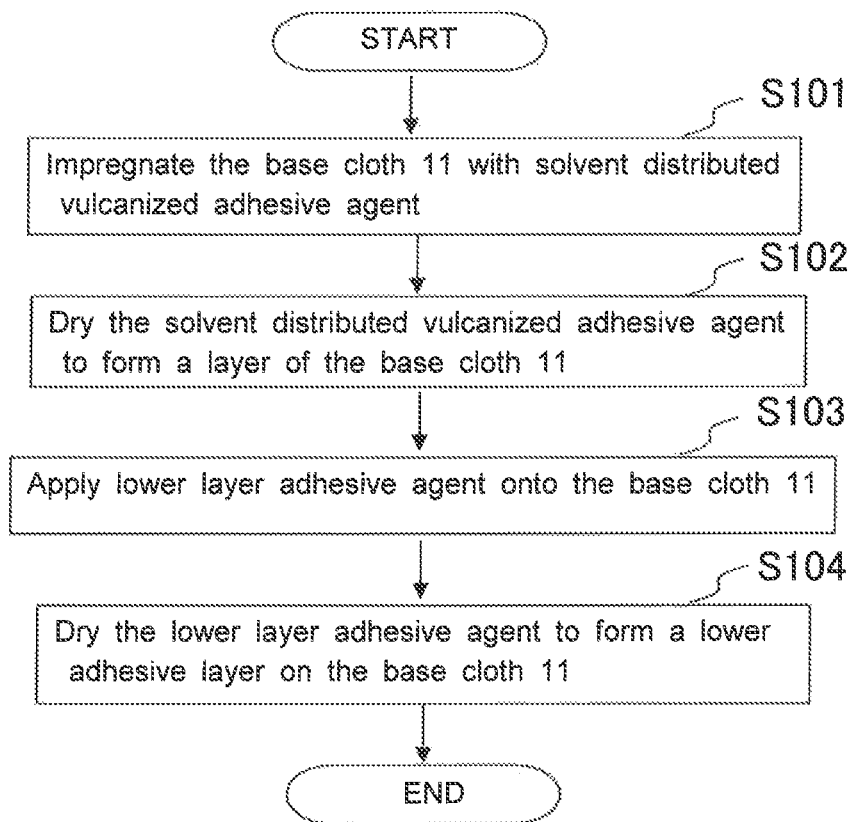
FIG. 2 is a manufacturing flow diagram of the adhesive sheet according to the first embodiment of the present invention.

A method of manufacturing the adhesive sheet 1 of the first embodiment of the present invention is described with reference to FIG. 2. In the method of manufacturing the adhesive sheet 1 of the first embodiment of the present invention, first, the base cloth 11 is impregnated with the solvent dispersed type vulcanization adhesive having reactivity with the unvulcanized rubber (S101). Then, the layer is dried to form the layer of the base cloth 11 (S102). Subsequently, an undercoating adhesive having reactivity with the metal is applied onto the layer of the base cloth 11 (S103). The undercoating adhesive is dried to form the undercoating adhesive layer 12 having reactivity with the metal (S104).

Figure 3:
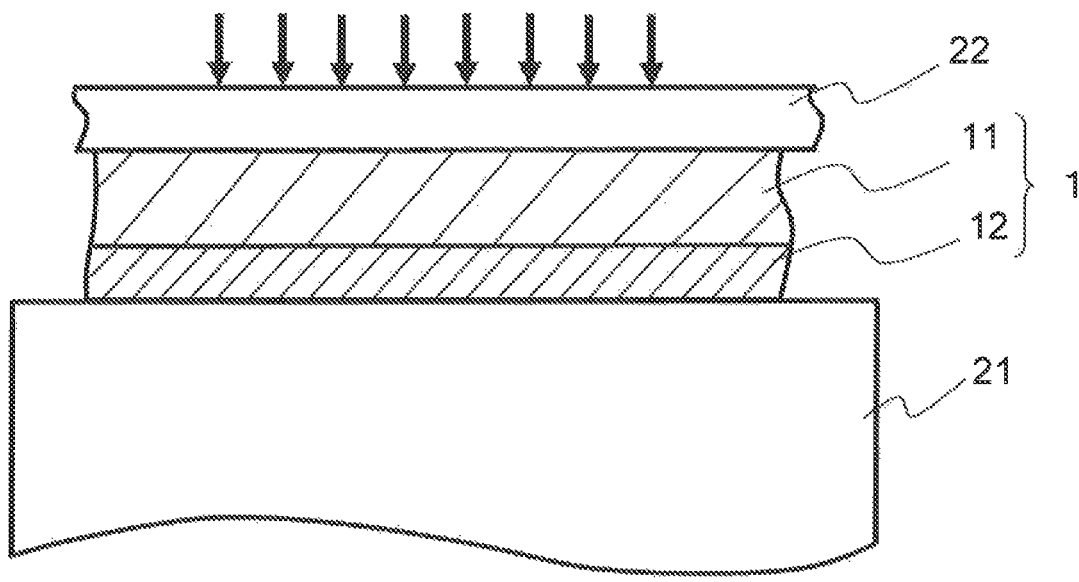
FIG. 3 is a view for illustrating a method of using the adhesive sheet of the first embodiment of the present invention.

Subsequently, a method of bonding an unvulcanized rubber 22 to a metal 21 with the adhesive sheet 1 of the first embodiment is described with reference to FIG. 3. The adhesive sheet 1 is mounted on the metal 21 so that the undercoating adhesive layer 12 is brought into contact with the surface of the metal. Meanwhile, the adhesive sheet is arranged so that the base cloth 11 is brought into contact with the unvulcanized rubber 22. Then, in this state, the unvulcanized rubber 22 is pressed against the metal 21 to be bonded thereto. The metal 21 and the unvulcanized rubber 22 to each of which the adhesive sheet 1 is attached are loaded into a die together with, for example, a natural rubber, and then molded under heat.

The surface of the base cloth 11 on a side to be bonded to the unvulcanized rubber 22 is subjected to a surface modification treatment. The surface modification treatment is typically, for example, surface modification based on the application of a surface treatment agent that reacts with the vulcanization adhesive well. Examples thereof include treatments, such as a resorcin-formalin-latex treatment (RFL treatment), a resorcin-hexamethylenetetramine-silica treatment, a resorcin-hexamethylenetetramine-epoxy resin treatment, an isocyanate treatment, an epoxy adhesive treatment, and a silane coupling treatment. In addition, plasma, a plasma polymerization treatment, a graft polymerization treatment, CVD, a PVD treatment, or an ion implantation treatment is available as surface modification based on a physical or chemical treatment. In addition, when the base cloth 11 is formed of an aramid fiber, a polyfunctional aziridine compound treatment, a plasma treatment, a treatment with a sulfonyl azide, an epoxy-based resin treatment, a treatment involving introducing a carboxymethyl group, a methacryloyl chloride treatment, a sizing treatment, a hot water treatment, or the like is typically available.

The adhesive sheet 1 according to the first embodiment of the present invention is used as, for example, an adhesive for bonding a seismic isolation rubber for a building, a seismic isolation rubber for a bridge, or any other seismic isolation rubber for civil engineering and construction to be used in, for example, a site where the vulcanization bonding of a rubber and a metal is needed in civil engineering and construction to a metal. Alternatively, the adhesive sheet is used in, for example, an anti-vibration rubber for an automobile, such as an engine mount, a strut mount, a urethane damper, a PR bush, or an FR bush, or any other rubber part for an automobile. In addition, the adhesive sheet is used in, for example, an industrial rubber part, such as an oil seal for a construction machine or a crawler for a construction machine.

Second Embodiment

Figure 4:
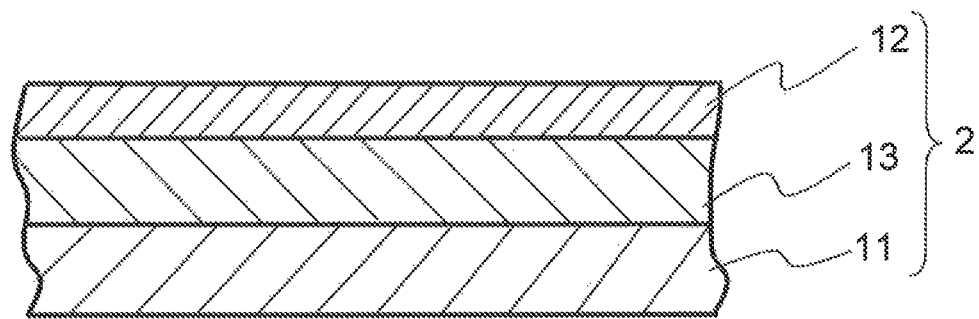
FIG. 4 is a schematic sectional view of an adhesive sheet according to a second embodiment of the present invention.

Subsequently, an adhesive sheet 2 for bonding an unvulcanized rubber to a metal is described as a second embodiment of the present invention with reference to FIG. 4. FIG. 4 is an illustration of a section of the adhesive sheet 2 of the second embodiment of the present invention. The adhesive sheet 2 of the present invention includes a base cloth 11, an undercoating adhesive layer 12, and a top coating adhesive layer 13. The base cloth 11 and undercoating adhesive layer 12 of the adhesive sheet 2 are the same as those of the first embodiment. In this embodiment, in the base cloth 11 and the undercoating adhesive layer 12, the surfaces of the undercoating adhesive layer 12 and the layer of the base cloth 11 contact with each other. This embodiment differs from the first embodiment in that this embodiment includes the top coating adhesive layer 13 between the base cloth 11 and the undercoating adhesive layer 12. That is, the top coating adhesive layer 13 is the layer of a solvent dispersed type vulcanization adhesive having reactivity with the unvulcanized rubber, and the top coating adhesive layer 13 of the solvent dispersed type vulcanization adhesive having reactivity with the unvulcanized rubber is formed between the interface of the undercoating adhesive layer 12 and the interface of the layer of the base cloth 11. As in the first embodiment, the base cloth 11 is a woven fabric or a nonwoven fabric. A material for the base cloth 11 is as described in the first embodiment. The undercoating adhesive of the undercoating adhesive layer 12 is also the same as that of the first embodiment.

The top coating adhesive layer 13 includes the same adhesive as the adhesive with which the base cloth 11 is impregnated. The top coating adhesive layer 13 exhibits an effect of compensating for the lack of the adhesive with which the base cloth 11 is impregnated. The thickness (amount) of the top coating adhesive layer 13 is selected in accordance with the base cloth 11. When the fiber density of the base cloth 11 is small and the content of the adhesive in the base cloth 11 is large, the thickness (amount) of the top coating adhesive layer 13 can be reduced. Meanwhile, when the fiber density of the base cloth 11 is large and the content of the adhesive in the base cloth 11 is small, the thickness (amount) of the top coating adhesive layer 13 is preferably increased.

Figure 5:
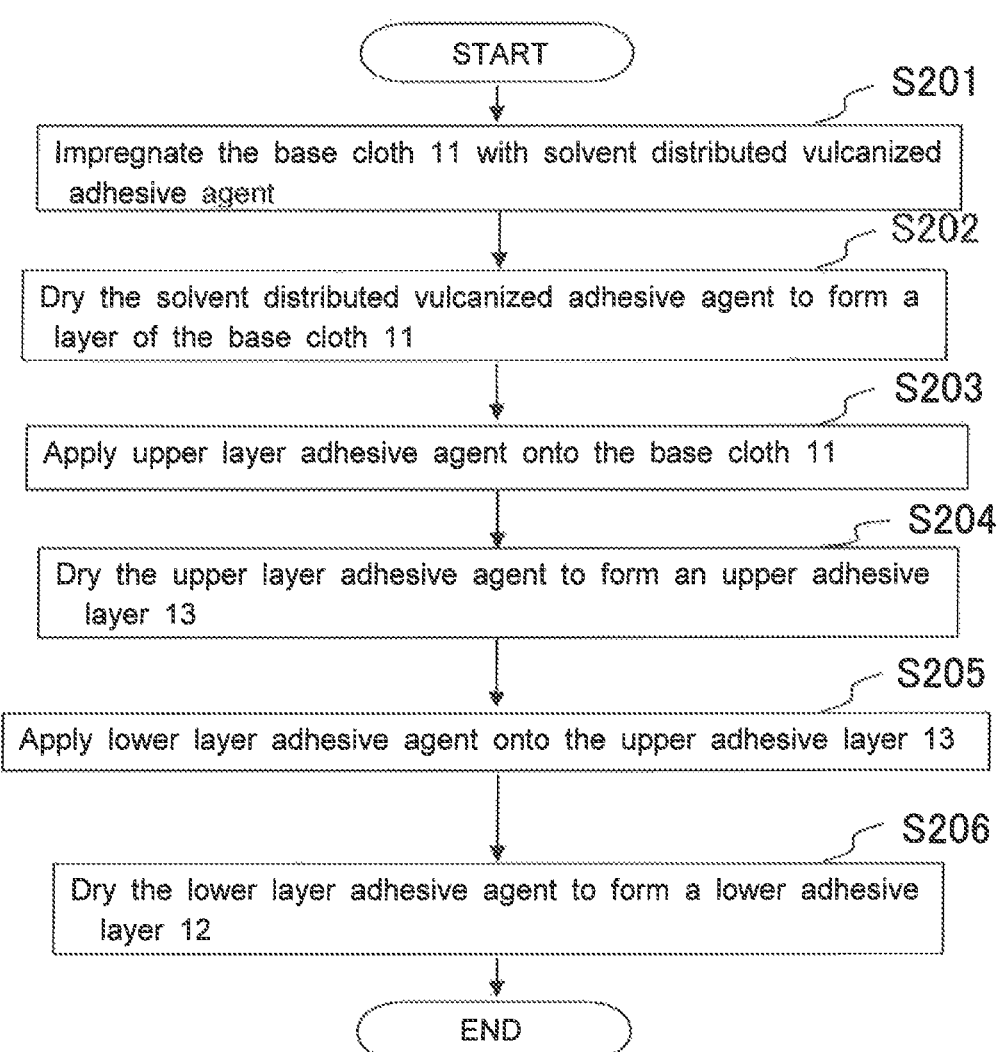
FIG. 5 is a manufacturing flow diagram of the adhesive sheet according to the second embodiment of the present invention.

A method of manufacturing the adhesive sheet 2 of the second embodiment of the present invention is described with reference to FIG. 5. In the method of manufacturing the adhesive sheet 2 of this embodiment, first, the base cloth 11 is impregnated with the solvent dispersed type vulcanization adhesive having reactivity with the unvulcanized rubber (S201). Then, the layer is dried to form the layer of the base cloth 11 (S202). Subsequently, a top coating adhesive that is the solvent dispersed type vulcanization adhesive having reactivity with the unvulcanized rubber, the adhesive serving as the same component as the adhesive with which the base cloth 11 is impregnated, is applied onto the layer of the base cloth 11 (S203). The top coating adhesive is dried to form the top coating adhesive layer 13 (S204). Then, after the formation of the top coating adhesive layer 13, the undercoating adhesive having reactivity with the metal is applied (S205). Then, the undercoating adhesive is dried to form the undercoating adhesive layer 12 having reactivity with the metal (S206).

Figure 6:
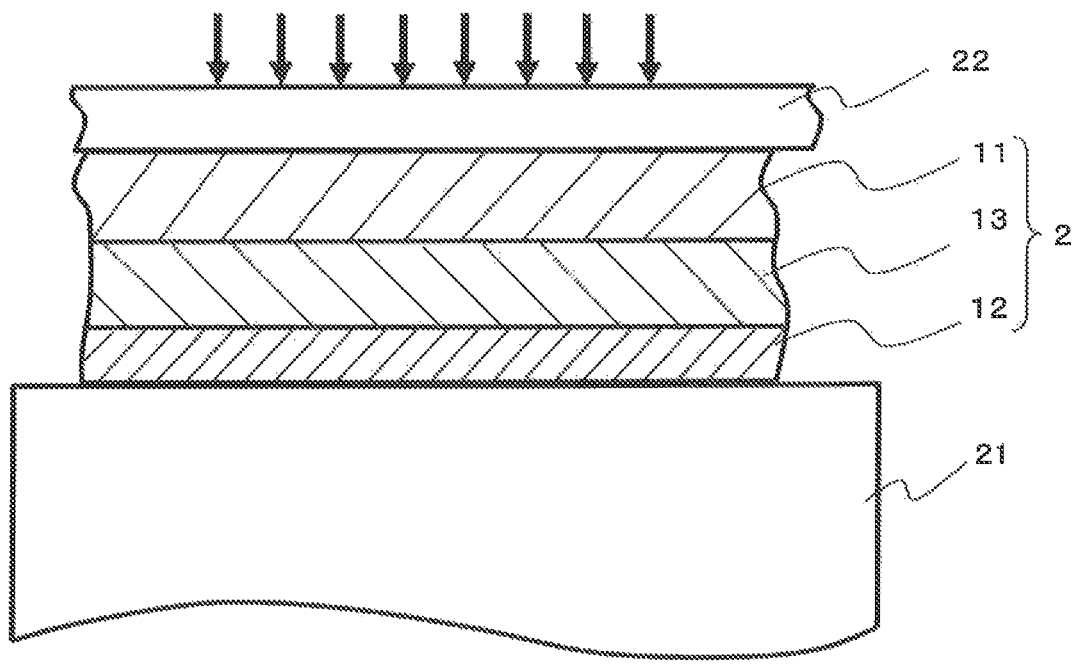
FIG. 6 is a view for illustrating a method of using the adhesive sheet of the second embodiment of the present invention.

Subsequently, a method of bonding the unvulcanized rubber 22 to the metal 21 with the adhesive sheet 2 of the second embodiment is described with reference to FIG. 6. The adhesive sheet 2 is mounted on the metal 21 so that the undercoating adhesive layer 12 is brought into contact with the surface of the metal 21. Meanwhile, the adhesive sheet is arranged so that the base cloth 11 is brought into contact with the unvulcanized rubber 22. Then, in this state, the unvulcanized rubber 22 is pressed against the metal 21 to be bonded thereto. The metal 21 and the unvulcanized rubber 22 to each of which the adhesive sheet 2 is attached are loaded into a die together with, for example, a natural rubber, followed by molding under heat.

As compared to the first embodiment, this embodiment exhibits, in particular, the following effect: the top coating adhesive layer 13 compensates for the lack of the amount of the adhesive with which the base cloth 11 is impregnated in accordance with the material for the base cloth 11 to further strengthen the bonding of the unvulcanized rubber to the metal.

Third Embodiment

Figure 7:
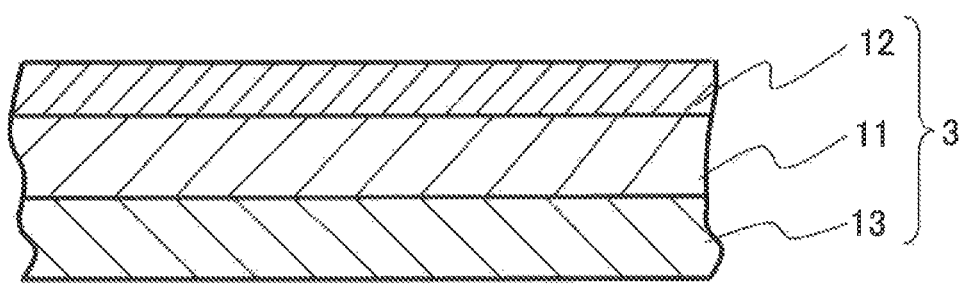
FIG. 7 is a schematic sectional view of an adhesive sheet according to a third embodiment of the present invention.

Subsequently, an adhesive sheet 3 for bonding an unvulcanized rubber to a metal is described as a third embodiment of the present invention with reference to FIG. 7. FIG. 7 is an illustration of a section of the adhesive sheet 3 according to the third embodiment of the present invention. The adhesive sheet 3 of the present invention includes a base cloth 11, an undercoating adhesive layer 12, and a top coating adhesive layer 13. The base cloth 11 and undercoating adhesive layer 12 of the adhesive sheet 2 are the same as those of the first embodiment, and the surfaces of the undercoating adhesive layer 12 and the layer of the base cloth 11 are in contact with each other. This embodiment differs from the first and second embodiments in that the top coating adhesive layer 13 is formed on the surface of the base cloth 11 opposite to the surface in the base cloth 11 on which the undercoating adhesive layer 12 is formed. As in the second embodiment, the top coating adhesive layer 13 is the layer of a solvent dispersed type vulcanization adhesive having reactivity with the unvulcanized rubber. As in the first embodiment, the base cloth 11 is a woven fabric or a nonwoven fabric. A material for the base cloth 11 is as described in the first embodiment. The adhesive of each of the undercoating adhesive layer 12 and the top coating adhesive layer 13 is also the same as that of the first embodiment.

The top coating adhesive layer 13 is the same as that of the second embodiment in that the layer includes the same adhesive as the adhesive with which the base cloth 11 is impregnated. The top coating adhesive layer 13 exhibits an effect of compensating for the lack of the adhesive with which the base cloth 11 is impregnated. The thickness (amount) of the top coating adhesive layer 13 is selected in accordance with the base cloth 11. When the fiber density of the base cloth 11 is small and the content of the adhesive in the base cloth 11 is large, the thickness (amount) of the top coating adhesive layer 13 can be reduced. Meanwhile, when the fiber density of the base cloth 11 is large and the content of the adhesive in the base cloth 11 is small, the thickness (amount) of the top coating adhesive layer 13 is preferably increased.

Figure 8:
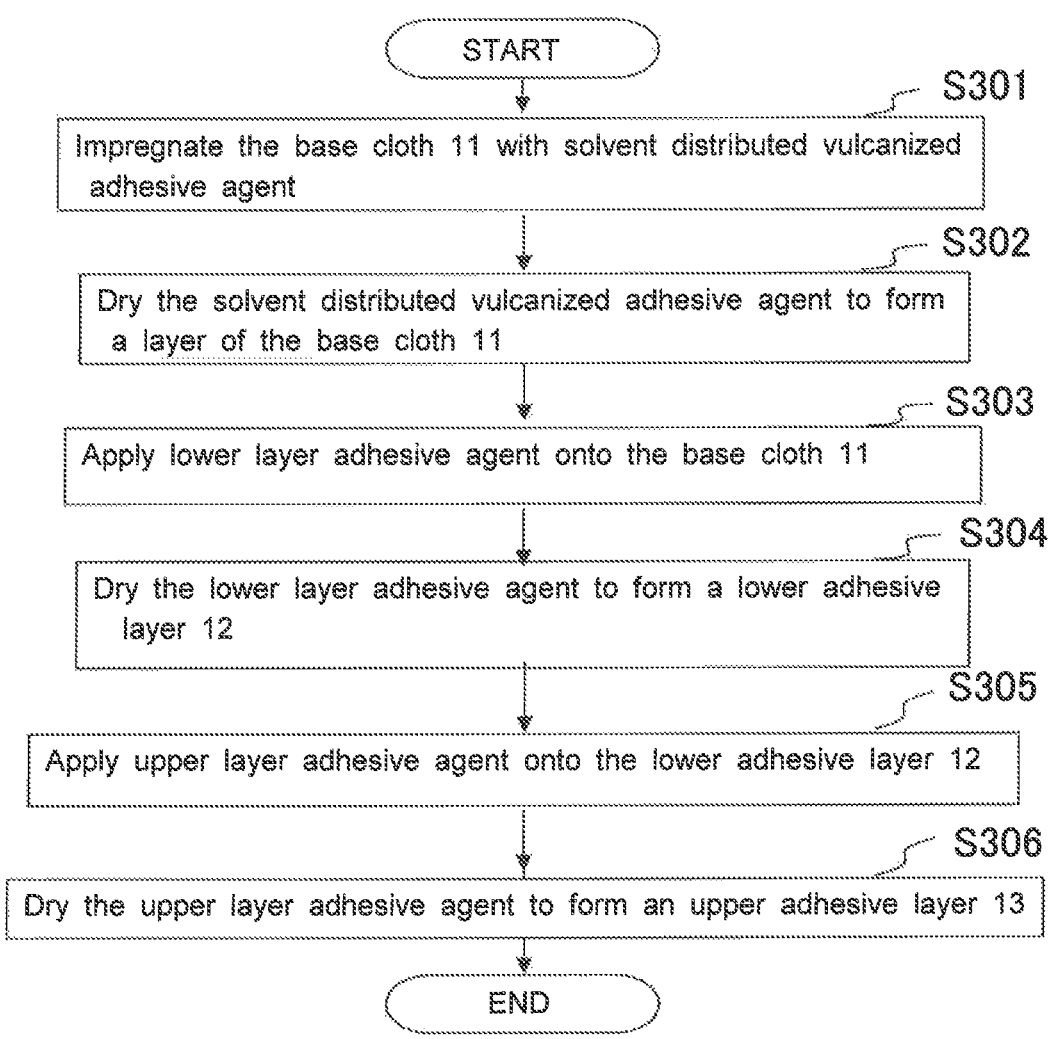
FIG. 8 is a manufacturing flow diagram of the adhesive sheet according to the third embodiment of the present invention.

A method of manufacturing the adhesive sheet 3 of the third embodiment of the present invention is described with reference to FIG. 8. In the method of manufacturing the adhesive sheet 3 of this embodiment, first, the layer of the base cloth 11 is impregnated with the solvent dispersed type vulcanization adhesive having reactivity with the unvulcanized rubber (S301). Then, the layer of the base cloth 11 is dried to form the layer of the base cloth 11 (S302). Subsequently, the undercoating adhesive having reactivity with the metal is applied onto the layer of the base cloth 11 (S303). Then, the undercoating adhesive is dried to form the undercoating adhesive layer 12 of the adhesive having reactivity with the metal (S304). Subsequently, the top coating adhesive that is the solvent dispersed type vulcanization adhesive having reactivity with the unvulcanized rubber, the adhesive serving as the same component as the adhesive with which the base cloth 11 is impregnated, is applied onto the surface of the base cloth 11 opposite to the surface of the base cloth 11 on which the undercoating adhesive layer 12 is formed (S305). The top coating adhesive is dried to form the top coating adhesive layer 13 (S306).

Figure 9:
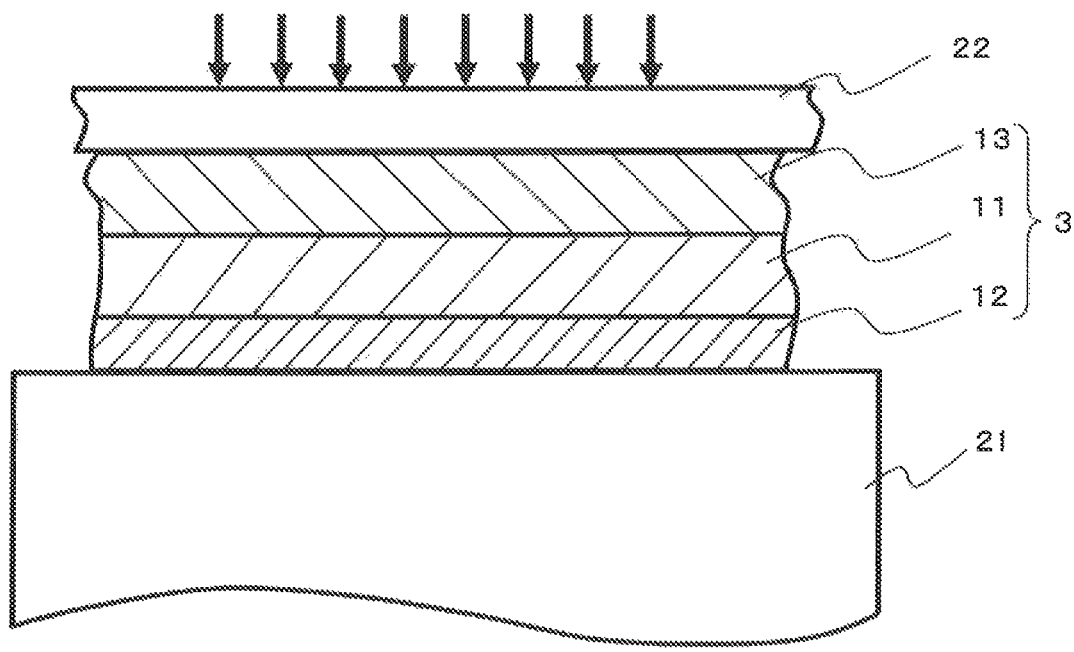
FIG. 9 is a view for illustrating a method of using the adhesive sheet of the third embodiment of the present invention.

Subsequently, a method of bonding the unvulcanized rubber 22 to the metal 21 with the adhesive sheet 3 of the third embodiment is described with reference to FIG. 9. The adhesive sheet 3 is mounted on the metal 21 so that the undercoating adhesive layer 12 is brought into contact with the surface of the metal 21. Meanwhile, the adhesive sheet is arranged so that the top coating adhesive layer 13 is brought into contact with the unvulcanized rubber 22. Then, in this state, the unvulcanized rubber 22 is pressed against the metal 21 to be bonded thereto. The metal 21 and the unvulcanized rubber 22 to each of which the adhesive sheet 3 is attached are loaded into a die together with, for example, a natural rubber, followed by molding under heat.

As in the second embodiment, this embodiment also exhibits, in particular, the following effect: the top coating adhesive layer 13 compensates for the lack of the amount of the adhesive with which the base cloth 11 is impregnated in accordance with the material for the base cloth 11 to further strengthen the bonding of the unvulcanized rubber to the metal. The third embodiment has, in particular, an effect of improving adhesiveness with the unvulcanized rubber because the top coating adhesive layer 13 is formed outside the base cloth 11.

REFERENCE SIGNS LIST

1, 2, 3 adhesive sheet
11 base cloth
12 undercoating adhesive layer
13 top coating adhesive layer
21 metal
22 unvulcanized rubber

The invention claimed is:

1. An adhesive sheet for bonding an unvulcanized rubber to a metal, the adhesive sheet comprising:
   a base adhesive layer including a base cloth whose thickness ranges between 1 micrometer and 100 micrometers, wherein a solvent dispersed type vulcanization adhesive having reactivity with the unvulcanized rubber is completely impregnated in the base cloth; and
   an adhesive layer having reactivity with the metal, on the base adhesive layer.

2. An adhesive sheet according to claim 1, wherein the base adhesive layer and the adhesive layer are formed so that a surface of the adhesive layer and a surface of the solvent dispersed type vulcanization adhesive of the base adhesive layer are brought into contact with each other.

3. An adhesive sheet according to claim 1, wherein the adhesive layer comprises a layer of a primer.

4. A method of manufacturing an adhesive sheet for bonding an unvulcanized rubber to a metal, the method comprising:
   forming a base adhesive layer by completely impregnating a base cloth whose thickness ranges between 1 micrometer and 100 micrometers, with a solvent dispersed type vulcanization adhesive having reactivity with the unvulcanized rubber and drying the base cloth; and
   applying a primer having reactivity with the metal onto the base adhesive layer to form a layer of the primer.

5. The adhesive sheet as claimed in claim 1, wherein the base cloth is processed by a surface modification treatment prior to the impregnation of the base cloth.

6. The adhesive sheet as claimed in claim 5, wherein the surface modification treatment of the base cloth includes a resorcin-formalin-latex treatment.

7. The method as claimed in claim 4, wherein the forming the base adhesive layer including processing by a surface modification treatment prior to the impregnating a base cloth with the solvent dispersed type vulcanization adhesive.

8. The method as claimed in claim 7, wherein the surface modification treatment of the base cloth includes a resorcin-formalin-latex treatment.

* * * * *